US012794802B2

(12) United States Patent
Mottiat et al.

(10) Patent No.: US 12,794,802 B2
(45) Date of Patent: Nov. 10, 2026

(54) SYSTEMS AND METHODS FOR VOICE COMMUNICATION ROUTING

(71) Applicant: Infobip Ltd., London (GB)

(72) Inventors: Frederic Mottiat, Brussels (BE); Kosta Pribić, Zagreb (HR); Almir Pehratović, Sarajevo (BA); Irfan Smajević, Sarajevo (BA); Armin Omerbegović, Sarajevo (BA); Ismar Kubat, Sarajevo (BA)

(73) Assignee: Infobip Ltd., London (GB)

( * ) Notice: Subject to any disclaimer, the term of this patent is extended or adjusted under 35 U.S.C. 154(b) by 303 days.

(21) Appl. No.: 18/465,266

(22) Filed: Sep. 12, 2023

(65) Prior Publication Data

US 2025/0088456 A1 Mar. 13, 2025

(51) Int. Cl.
*H04L 45/28* (2022.01)
*H04M 7/00* (2006.01)

(52) U.S. Cl.
CPC .......... *H04L 45/28* (2013.01); *H04M 7/0081* (2013.01)

(58) Field of Classification Search
CPC ..... H04L 45/28; H04L 45/22; H04L 65/1046; H04L 65/1069; H04L 65/1096; H04L 65/1053; H04L 65/1104; H04L 65/1108; H04M 7/0081; H04M 3/54; H04M 7/0003; H04M 7/0057; H04M 7/0096
See application file for complete search history.

(56) References Cited

U.S. PATENT DOCUMENTS

| | | | | |
|---|---|---|---|---|
| 8,634,534 | B1 * | 1/2014 | Brandt | H04M 7/0057 370/220 |
| 9,025,438 | B1 * | 5/2015 | Palmer | H04M 7/0006 379/220.01 |
| 9,654,440 | B1 * | 5/2017 | Nehme Antoun | H04L 12/4633 |
| 2008/0013447 | A1 * | 1/2008 | Lauber | H04L 65/1045 370/225 |
| 2014/0274086 | A1 * | 9/2014 | Boerjesson | H04L 65/1104 455/450 |
| 2016/0119179 | A1 * | 4/2016 | Palmer | H04L 65/1104 370/220 |
| 2017/0272479 | A1 * | 9/2017 | Fritz | H04L 65/1093 |
| 2019/0089750 | A1 * | 3/2019 | Hassan | H04L 45/245 |
| 2021/0051530 | A1 * | 2/2021 | Venkataraman | H04L 65/1016 |

(Continued)

OTHER PUBLICATIONS

Defintion of "represent" from Dictionary.com (accessed Feb. 6, 2026) (Year: 2026).*

(Continued)

*Primary Examiner* — Andrew W Chriss
(74) *Attorney, Agent, or Firm* — Bookoff McAndrews, PLLC

(57) ABSTRACT

A method for routing traffic for voice communication includes: receiving a request to establish a telecommunication link with a destination phone number; transmitting the received request to establish the telecommunication link to the destination phone number via a session initiated protocol (SIP) trunk; determining that the request to establish the telecommunication link via the SIP trunk failed; and transmitting, via a communication channel other than the SIP trunk, the received request to establish the telecommunication link to a separate destination based on a predetermined routing protocol.

20 Claims, 11 Drawing Sheets

(56) References Cited

U.S. PATENT DOCUMENTS

| | | | | |
|---|---|---|---|---|
| 2023/0318995 | A1* | 10/2023 | Jensen | H04L 41/5009 709/206 |
| 2025/0184834 | A1* | 6/2025 | Chung | H04W 36/0022 |

OTHER PUBLICATIONS

Gaboli et al, "Sip Trunking the Route to the New Voip Services", 2010 ITU-T Kaleidoscope Academic Conference (Year: 2010).*

Apr. 16, 2024 International Search Report issued in International Patent Application No. PCT/EP2023/076126.

* cited by examiner

SYSTEMS AND METHODS FOR VOICE COMMUNICATION ROUTING

TECHNICAL FIELD

Various embodiments of the present disclosure relate to routing traffic, and, more specifically, to protocols for routing traffic for voice communication.

BACKGROUND

Engineers from telecommunications platforms, telecommunications platform customers, or telecommunication network operators (e.g., telephone companies) may create and manage routes for voice call traffic based on voice infrastructure (e.g., on session border controllers (SBCs), voice gateways, private branch exchanges (PBXes), etc.). This route management may be managed at a session initiated protocol (SIP) trunking level.

Actions may be defined for when an incoming call reaches a phone number associated with a customer of a telecommunications platform. Examples of such actions may include forwarding to a phone (e.g., any incoming call to the designated number may be forwarded to a predefined phone number), forwarding to an application associated with the telecommunications platform (e.g., an instant messaging or video call application), forwarding to a predefined interactive voice response (IVR) scenario, forwarding to a customer's application (e.g., via webhook integration), or forwarding to an internet protocol (IP) address (e.g., using a predefined SIP trunk). Conventionally, each of these forwarding actions is unique, and there is no possibility for fail-over if any given forwarding action fails.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques described herein relate to a method for routing traffic for voice communication, the method including: receiving a request to establish a telecommunication link with a destination phone number; transmitting the received request to establish the telecommunication link to the destination phone number via a session initiated protocol (SIP) trunk; determining that the request to establish the telecommunication link via the SIP trunk failed; and transmitting, via a communication channel other than the SIP trunk, the received request to establish the telecommunication link to a separate destination based on a predetermined routing protocol.

In some aspects, the techniques described herein relate to a method, wherein the determining that the request to establish the telecommunication link failed includes receiving an indication from the destination that the request has been denied.

In some aspects, the techniques described herein relate to a method, wherein the determining that the request to establish the telecommunication link failed includes a timeout for response from the destination.

In some aspects, the techniques described herein relate to a method, wherein the destination phone number is associated with one or more of an internet protocol (IP) phone or a voice over IP (VoIP) phone.

In some aspects, the techniques described herein relate to a method, wherein the communication channel other than a SIP trunk includes a public switched telephone network (PSTN) line.

In some aspects, the techniques described herein relate to a method, wherein the communication channel other than the SIP trunk includes an internet network connection.

In some aspects, the techniques described herein relate to a method, wherein the separate destination includes a customer application.

In some aspects, the techniques described herein relate to a method, wherein the separate destination is a web real-time communication application.

In some aspects, the techniques described herein relate to a method, wherein the separate destination is a uniform resource locator (URL) pointing to a customer exposed webhook, and wherein the customer exposed webhook permits dynamic routing following creation of the predetermined routing protocol.

In some aspects, the techniques described herein relate to a method, wherein the separate destination is a PSTN-connected phone line.

In some aspects, the techniques described herein relate to a method, further including: determining that the received request to establish the telecommunication link to a separate destination via a communication channel other than the SIP trunk failed; and transmitting, via a second communication channel other than the SIP trunk, the received request to establish the telecommunication link to a second separate destination based on the predetermined routing protocol.

In some aspects, the techniques described herein relate to a non-transitory computer-readable medium storing instructions thereon that, when executed by one or more processors, cause the one or more processors to perform operations including: receiving a request to establish a telecommunication link with a destination phone number; transmitting the received request to establish the telecommunication link to the destination phone number via a session initiated protocol (SIP) trunk; determining that the request to establish the telecommunication link via the SIP trunk failed; and transmitting, via a communication channel other than the SIP trunk, the received request to establish the telecommunication link to a separate destination based on a predetermined routing protocol.

In some aspects, the techniques described herein relate to a non-transitory computer-readable medium, wherein the communication channel other than the SIP trunk includes an internet network connection.

In some aspects, the techniques described herein relate to a non-transitory computer-readable medium, wherein the separate destination is a uniform resource locator (URL) pointing to a customer exposed webhook, and wherein the customer exposed webhook permits dynamic routing following creation of the predetermined routing protocol.

In some aspects, the techniques described herein relate to a non-transitory computer-readable medium, further including instructions thereon that, when executed by the one or more processors, cause the one or more processors to further perform operations including: determining that the received request to establish the telecommunication link to a separate destination via a communication channel other than the SIP trunk failed; and transmitting, via a second communication channel other than the SIP trunk, the received request to establish the telecommunication link to a second separate destination based on a predetermined routing protocol.

In some aspects, the techniques described herein relate to a non-transitory computer-readable medium, wherein the separate destination includes a customer application.

In some aspects, the techniques described herein relate to a non-transitory computer-readable medium, wherein the separate destination is a web real-time communication application.

In some aspects, the techniques described herein relate to a system including: a data storage device storing processor-readable instructions; and one or more processors operatively connected to the data storage device and configured to execute the instructions to perform operations including: receiving a request to establish a telecommunication link with a destination phone number; transmitting the received request to establish the telecommunication link to the destination phone number via a session initiated protocol (SIP) trunk; determining that the request to establish the telecommunication link via the SIP trunk failed; and transmitting, via a communication channel other than the SIP trunk, the received request to establish the telecommunication link to a separate destination based on a predetermined routing protocol.

In some aspects, the techniques described herein relate to a system, wherein the communication channel other than the SIP trunk includes an internet network connection.

In some aspects, the techniques described herein relate to a system, wherein the separate destination is a uniform resource locator (URL) pointing to a customer exposed webhook, and wherein the customer exposed webhook permits dynamic routing following creation of the predetermined routing protocol.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
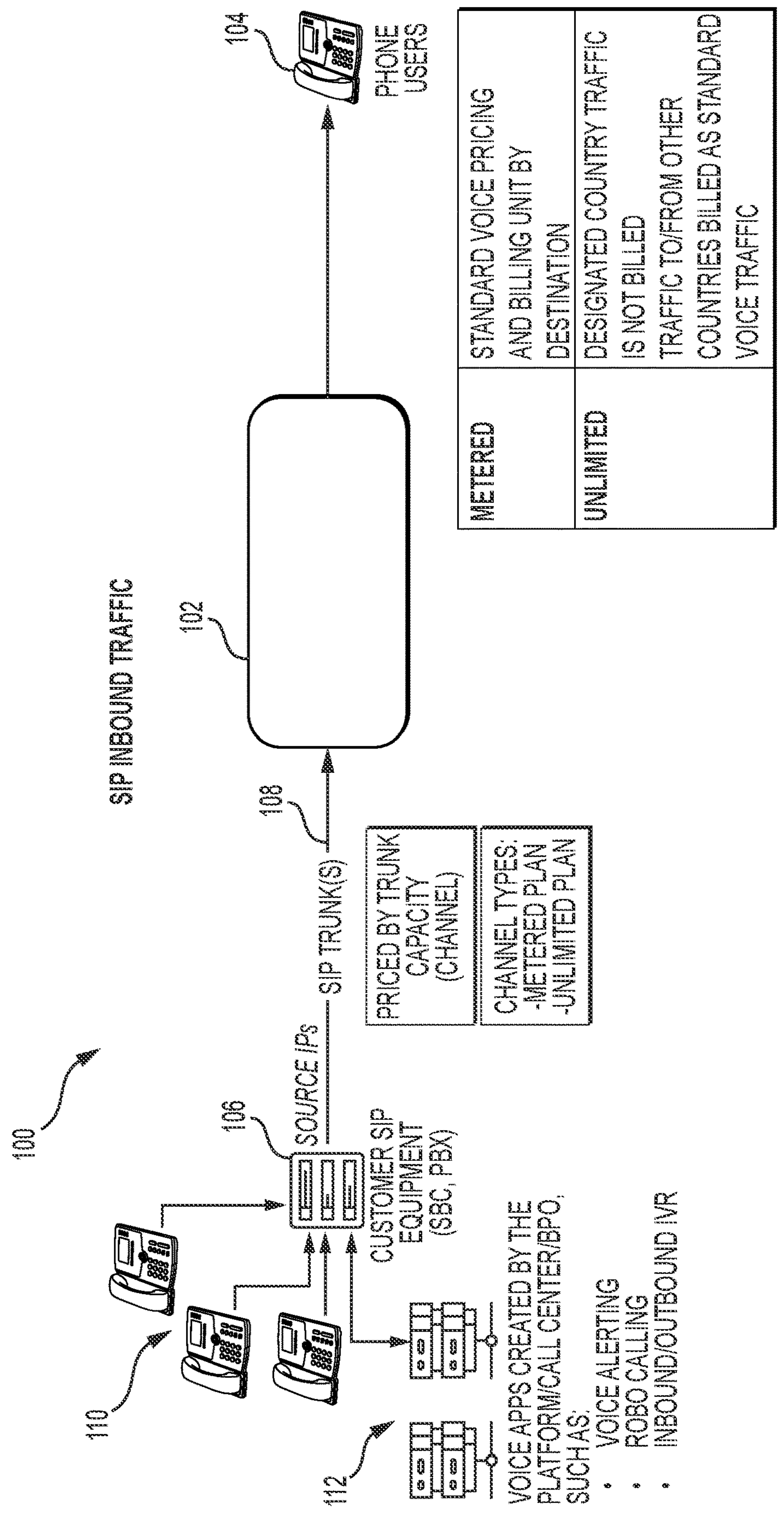
FIG. 1 is a flow diagram depicting inbound SIP traffic, in accordance with one or more embodiments.

Engineers from telecommunications platforms, telecommunications platform customers, or telecommunication network operators (e.g., telephone companies) may create and manage routes for voice call traffic based on voice infrastructure (e.g., on session border controllers (SBCs), voice gateways, private branch exchanges (PBXes), etc.). This route management may be managed at a session initiated protocol (SIP) trunking level.

Actions may be defined for when an incoming call reaches a phone number associated with a customer of a telecommunications platform. Examples of such actions may include forwarding to a phone (e.g., any incoming call to the designated number may be forwarded to a predefined phone number), forwarding to an application associated with the telecommunications platform (e.g., an instant messaging or video call application), forwarding to a predefined interactive voice response (IVR) scenario, forwarding to a customer's application (e.g., via webhook integration), or forwarding to an internet protocol (IP) address (e.g., using a predefined SIP trunk). Conventionally, each of these forwarding actions is unique, and there is no possibility for fail-over if any given forwarding action fails.

Disclosed herein is a system that, where a forwarding action fails, allows for further additional actions. This increases redundancy, resiliency, and additional opportunities for the call to be received. Instead of only being able to forward incoming calls to a single SIP trunk, the present disclosure allows for a telecommunications platform customer to define a route for forwarding a call to a specific number, where the route includes one or more SIP trunks, a public switched telephone network (PSTN) phone, a customer application with web real-time communication (WebRTC), an application managed by the telecommunications platform, and/or a uniform resource locator (URL) (e.g., customer exposed webhook). If a SIP trunk from the customer in a route is not reachable (e.g., fails due to network connectivity issues), the call may be forwarded to one or more other endpoints including SIP trunks, customer applications, telecommunication platform applications, URLs, or phone lines.

In some cases, a dynamic element may be included in the form of a customer-defined webhook. When a certain dynamic element is triggered in the route execution, the telecommunications platform may send a request to an external customer application. The external customer application may respond to the telecommunications platform with instructions for forwarding the call. Accordingly, although the same route element may be triggered by different calls, different results may be returned by the external customer application.

As disclosed herein, users may create routes for routing traffic related to telecommunication links. Each route may include one or more destinations of different types. For example, destinations may include a standard phone number (e.g., link established over a PSTN), a SIP trunk, a telecommunications platform application, an application related to a customer of a telecommunications platform, or a URL (e.g., a webhook). Each destination in a route may be assigned a priority (e.g., an order in which destinations in a route are evaluated) and a weight (e.g., how traffic is distributed to destinations that share the same priority).

A designated route may be assigned to or associated with a phone number on the telecommunications platform (e.g., a voice number provided to a customer by the telecommunications platform). In this case, an incoming call to a destination voice number may trigger execution of a route associated the destination voice number. The system will attempt to forward this incoming call to the first destination in the list. If this attempt is not successful (e.g., recipient not answering or call fails due to a network issue, etc.), the second entry in the route with the next highest priority is evaluated (e.g., the incoming call is forwarded to the destination associated with the second entry in the route), and so on.

Routes may also be assigned criteria, including, for example, any phone call coming from a particular number, any traffic coming from a SIP trunk with a particular reference, destination or source numbers, and/or designated headers for SIP traffic. When such criteria are defined, the telecommunications platform may receive traffic, consider the traffic in relation to a particular customer or account, and determine whether the traffic matches any defined route criteria. If the traffic meets the defined route criteria, the route associated with the defined criteria may be triggered and executed.

Calls may be routed to a customer's SIP infrastructure without regard to where the call originates. The call may originate from direct inward dialing (DID), an extension entered by the call originator, or a username entered by the call originator. While reference may be made to SIP infrastructure, the disclosure herein is not limited to routing or forwarding calls to a customer's SIP infrastructure. Inbound calls to DID may be associated with particular routes. Calls from a SIP trunk may not include route lists but may simply be forwarded to the destination. A routing application may use IP core logic once submitted to an IP core, which may include using a layer three (L3) routing application, application programming interface (API), and user interface (UI) for end users. Route destinations may include SIP trunks or SIP trunk groups, a PSTN-connected phone line, and one or more applications (e.g., IVR, API application, etc.).

A route list may include multiple entries which may be attempted in a particular order. The order may be customizable by the customer, but there may be a default order. Each entry may be attempted following the failure of a previous entry in the route list. The failure may be determined using SIP error codes and strict timeouts (e.g., 4 seconds). The failure may be determined by receiving an indication from the destination that the request has been denied. In some embodiments, there may be a maximum number of entries that may be added to the route list. Further, in some embodiments, the final fallback entry may be a PSTN-connected phone line. Accordingly, when a connection with a particular phone number is requested by a user phone via DID, an action may be triggered to forward to routing, which may activate the route list protocol.

If all entries fail, the call is not successful and a final SIP error code may be returned to an end user (e.g., call originator) and/or the customer indicating that all the entries in the route failed. If, for example, the first entry in the route fails, or even if the second entry fails, if the third route goes through, then the call is deemed successful. If a destination for a routing entry is a PSTN-connected phone line, the caller identification (e.g., caller ID) may be included or it may be overwritten. For example, if the caller is an extension, it may be preferred to not present the extension as caller ID to the PSTN destination.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used herein may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only, and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value. In this disclosure, the term "higher" refers to more, greater than, or up. In this disclosure, the term "lower" refers to below, less than, or down.

FIG. 1 is a flow diagram 100 depicting SIP inbound traffic, in accordance with one or more embodiments. A telecommunications platform 102 may receive inbound SIP traffic from customer SIP equipment 106 (e.g., source IP addresses) via one or more SIP trunks 108. Customer SIP equipment 106 may include one or more session border controllers (SBC) or private branch exchange (PBX) systems. SIP trunks 108 may be priced for customer use by trunk capacity (e.g., type of channel). In some cases, SIP trunks 108 may include channel types for a metered plan or an unlimited plan.

Customer SIP equipment 106 may receive traffic, including voice calls from customer phone lines 110 (e.g., IP phones or Voice over Internet Protocol (VoIP) phones) or voice applications 112 created and managed by telecommunications platform 102, a third-party call center, or an application managed via business process outsourcing (BPO). Voice applications 112 may include voice alerting applications, robocall applications (e.g., providing automatic calls that deliver a pre-recorded message), or inbound/outbound interactive voice response (IVR) applications. Customer SIP equipment may forward traffic received from customer phone lines 110 and voice applications 112 to telecommunications platform 102 via SIP trunks 108.

Telecommunications platform 102 may forward the received inbound SIP traffic from customer SIP equipment 106 to destination phone 104. Phone 104 may be an example of a standard telephone connected via PSTN. Destination phone 104 may also be an example of an IP or VoIP phone. In some embodiments, telecommunications platform 102 may transfer a call originating from an IP source (e.g., customer SIP equipment 106) to a PSTN destination through VoIP gateways, PBX systems, or soft switches. Telecommunications platform 102 may meter the calls using standard voice pricing and billing units according to destination of the call. Telecommunications platform 102 may also allow for unlimited traffic, even for international calls. In this case, traffic to and from other countries may be billed as standard domestic voice traffic.

Figure 2:
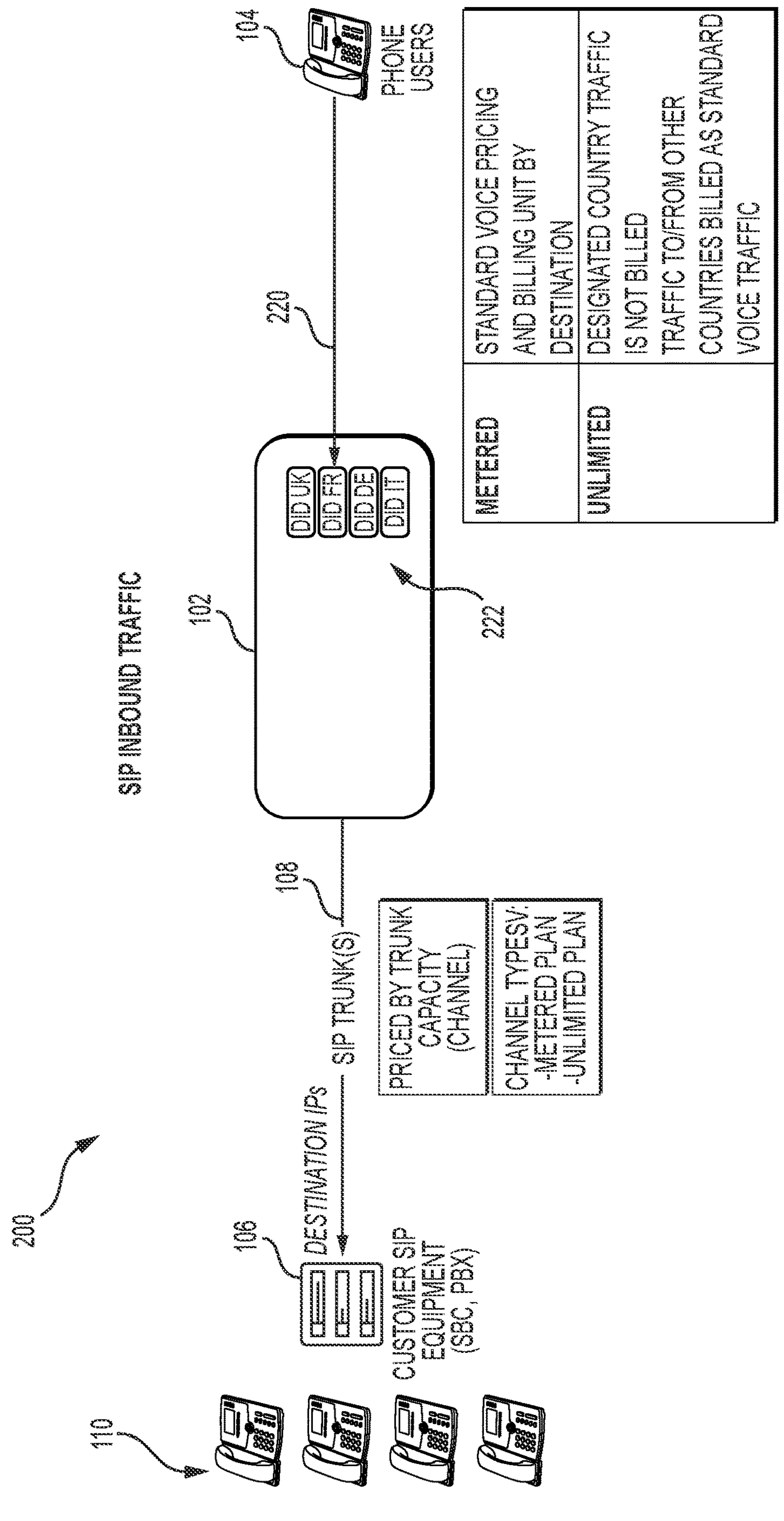
FIG. 2 is a flow diagram depicting outbound SIP traffic, in accordance with one or more embodiments.

FIG. 2 is a flow diagram 200 depicting outbound SIP traffic, in accordance with one or more embodiments. Telecommunications platform 102 may receive an incoming call 220 from phone 104. Similar to flow diagram 100 of FIG. 1, telecommunications platform 102 may provide for metered voice call traffic or for unlimited international calling. In some embodiments, incoming call 220 is directed to a specific country or, in some cases, a specific individual, instead of being directed to a general company phone line. Accordingly, telecommunications platform 102 may provide for direct inward dialing (DID) to recipients via phone numbers 222. By way of example, telecommunications platform 102 may own and/or rent (e.g., provide for the customer's use) individual phone numbers 222 to a customer. As shown in FIG. 2, individual phone numbers 222 may correspond to different offices in different countries, which may avoid international calling fees.

Telecommunications platform 102 may forward incoming call 220 to customer SIP equipment 106 via SIP trunks 108. Customer SIP equipment 106 may then forward the call received via SIP trunks 108 to one of customer phone lines 110. In this manner, a user of phone 104 may be connected to a voice call with a user of one of customer phone lines 110.

Figure 3:
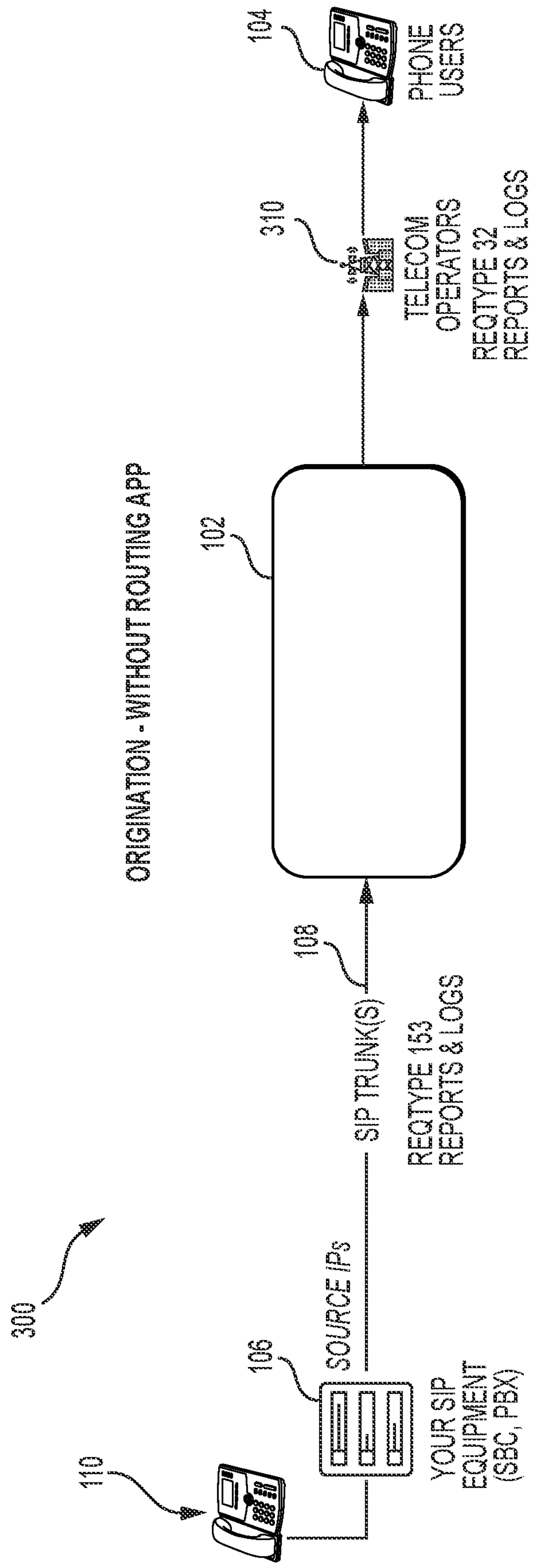
FIG. 3 is a flow diagram depicting an origination of a call without use of a routing application, in accordance with one or more embodiments.

FIG. 3 is a flow diagram 300 depicting an origination of a call without use of a routing application, in accordance with one or more embodiments. Telecommunications platform 102 may receive inbound SIP traffic from customer SIP equipment 106 (e.g., source IP addresses) via one or more SIP trunks 108. Customer SIP equipment 106 may include one or more session border controllers (SBC) or private branch exchange (PBX) systems. SIP trunks 108 may be priced for customer use by trunk capacity (e.g., type of channel). In some cases, SIP trunks 108 may include channel types for a metered plan or an unlimited plan. Customer SIP equipment 106 may receive traffic including voice calls from customer phone lines 110 (e.g., IP phones or Voice over Internet Protocol (VoIP) phones). Customer SIP equipment may forward traffic received from customer phone lines 110 to telecommunications platform 102 via SIP trunks 108.

Telecommunications platform 102 may forward the received inbound SIP traffic from customer SIP equipment 106 to telecom operators 310, which may route the inbound SIP traffic to destination phone 104. Phone 104 may be an example of a standard telephone connected via PSTN. Destination phone 104 may also be an example of an IP or VoIP phone. Telecommunication platform 102 may actively operate as a bridging platform, where inbound SIP traffic is one call leg, and outbound phone traffic is another separated call leg. Telecommunication platform 102 may handle call establishment to the outbound call, and once connected, telecommunication platform 102 may bridge the outbound call to the inbound SIP call.

Figure 4:
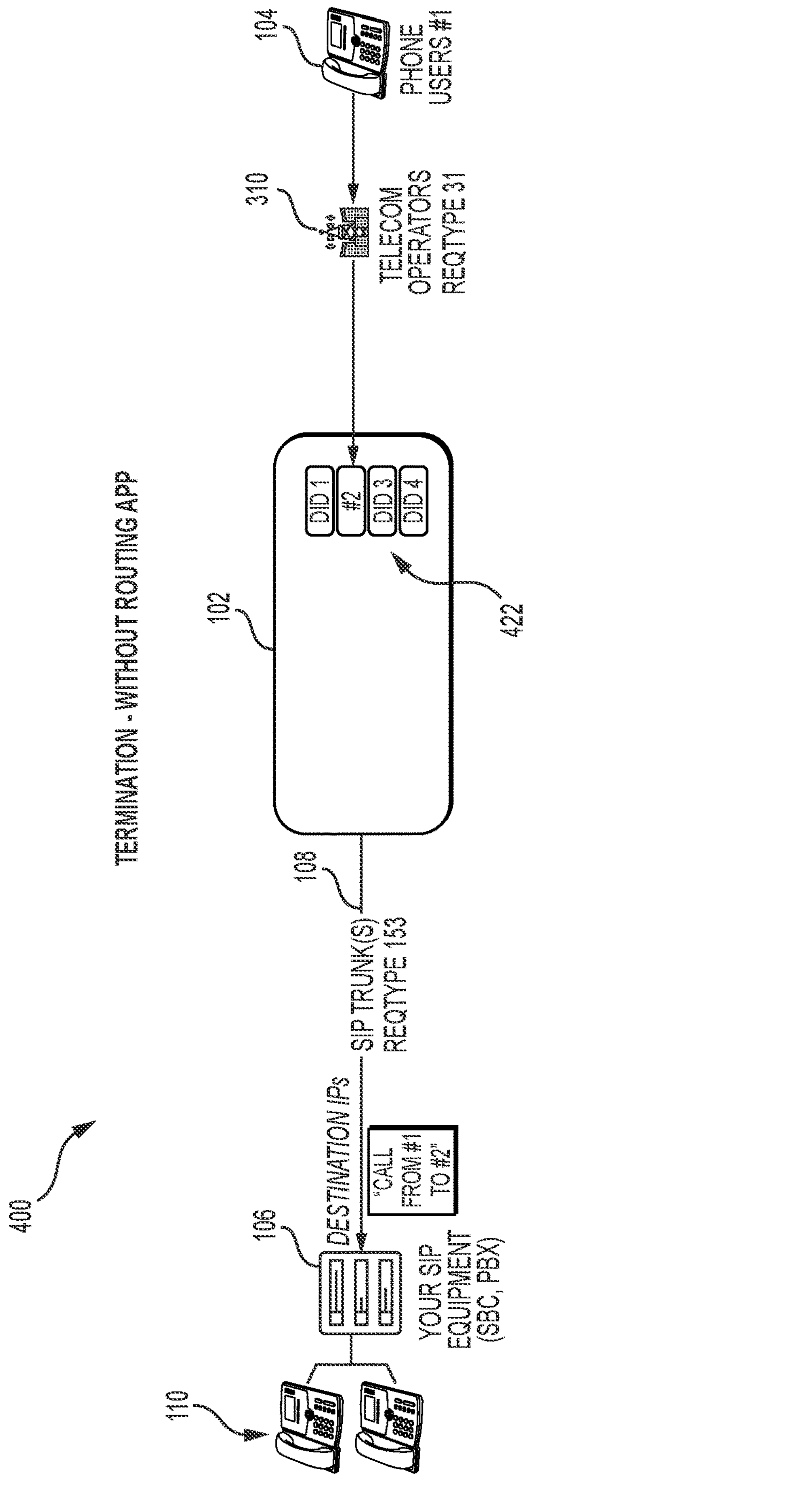
FIG. 4 is a flow diagram depicting a termination of a call without use of a routing application, in accordance with one or more embodiments.

FIG. 4 is a flow diagram 400 depicting a termination of a call without use of a routing application, in accordance with one or more embodiments. Telecommunications platform 102 may receive an incoming call via telecom operators 310 from phone 104. Similar to flow diagram 100 of FIG. 1, telecommunications platform 102 may provide for metered voice call traffic or for unlimited international calling. In some embodiments, the incoming call is directed to a specific country or, in some cases, a specific individual, instead of being directed to a general company phone line. Accordingly, telecommunications platform 102 may provide for direct inward dialing (DID) to recipients via phone numbers 422. By way of example, telecommunications platform 102 may own and/or rent (e.g., provide for the customer's use) individual phone numbers 422 to a customer. As shown in FIG. 4, individual phone numbers 422 may correspond to different offices in different countries, which may avoid international calling fees.

Telecommunications platform 102 may forward the incoming call to customer SIP equipment 106 via SIP trunks 108. Customer SIP equipment 106 may then forward the call received via SIP trunks 108 to one of customer phone lines 110. In this manner, a user of phone 104 may be connected to a voice call with a user of one of customer phone lines 110. Telecommunication platform 102 may actively operate as a bridging platform, where inbound phone traffic is one call leg, and outbound SIP phone traffic is another separated call leg. Telecommunication platform 102 may handle call establishment to the outbound call, and once connected, telecommunication platform 102 may bridge the outbound call to the inbound phone call.

Figure 5:
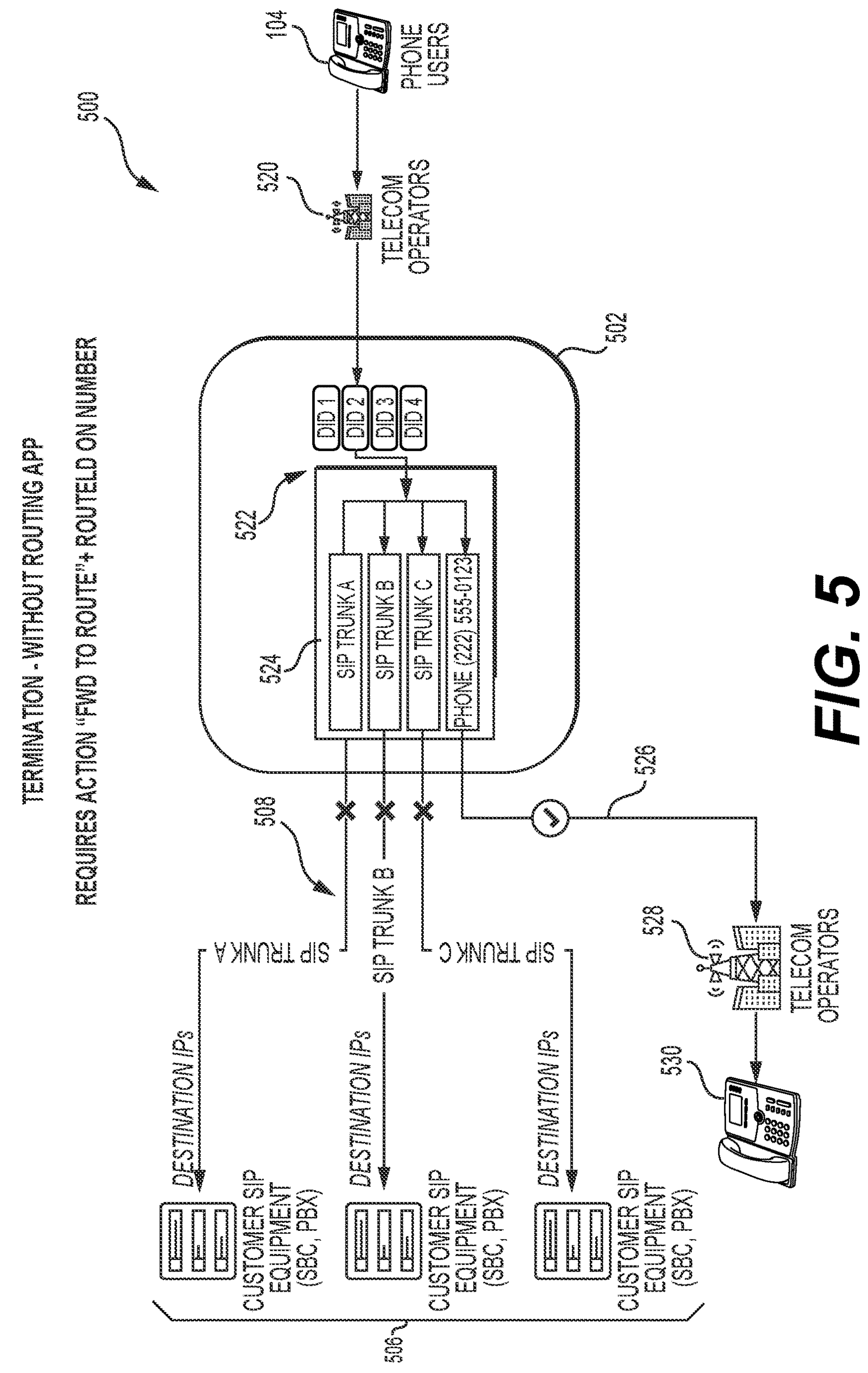
FIG. 5 is a flow diagram depicting a termination of a call with use of a routing application, in accordance with one or more embodiments.

FIG. 5 is a flow diagram 500 depicting a termination of a call with use of a routing application, in accordance with one or more embodiments. A phone call may originate with phone 104. Telecom operator(s) 520 may receive the initial request to connect phone 104 with an intended destination and forward the request to telecommunications platform 502 which owns the phone number associated with the intended destination. A group of phone numbers 522 owned by telecommunications platform 502 provide for direct inward dialing (DID). In the example shown in FIG. 5, DID 2 of phone numbers 522 receives the incoming call from operator(s) 520. Telecommunications platform 502 includes logic for routing the incoming call to the intended destination.

An administrator of telecommunications platform 502 may create and manage (e.g., edit) routing protocol 524, determining which path an incoming call for DID 2 of group of phone numbers 522 should take. In other words, a protocol may be predetermined that provides directions for how an incoming call should be directed and/or redirected should one or more paths (e.g., communication channels) or destinations (e.g., destination IP addresses) fail, or based on a priority. Predetermined routing protocol 524 may be invoked by telecommunications platform 502.

A first operation in routing the incoming call may be to transmit the request to connect to a first destination IP address via SIP trunk A of SIP trunks 508. However, telecommunications platform 502 may determine that SIP trunk A has failed. Determining a failure of SIP trunk A may include receiving an indication from the destination IP address (e.g., customer SIP equipment 506, such as a SBC or PBX) associated with SIP trunk A that it is unable to receive the incoming call request. This may be an example of a SIP error code. Determining the failure may also include not receiving a response from the destination IP address for a specified period of time (e.g., a "timeout"). Upon determining that SIP trunk A has failed, routing protocol 524 may direct the request to SIP trunk B. Upon determining that SIP trunk B has also failed, routing protocol 524 may direct the request to SIP trunk C. Upon determining that SIP trunk C has failed, routing protocol 524 may direct the request to PSTN connection 526. Telecom operator 528 may receive the request and forward the connection request to phone 530. As shown in FIG. 5, this final connection request may be successful in connecting phone 104 with an intended destination (e.g., a user of phone 530).

Figure 6:
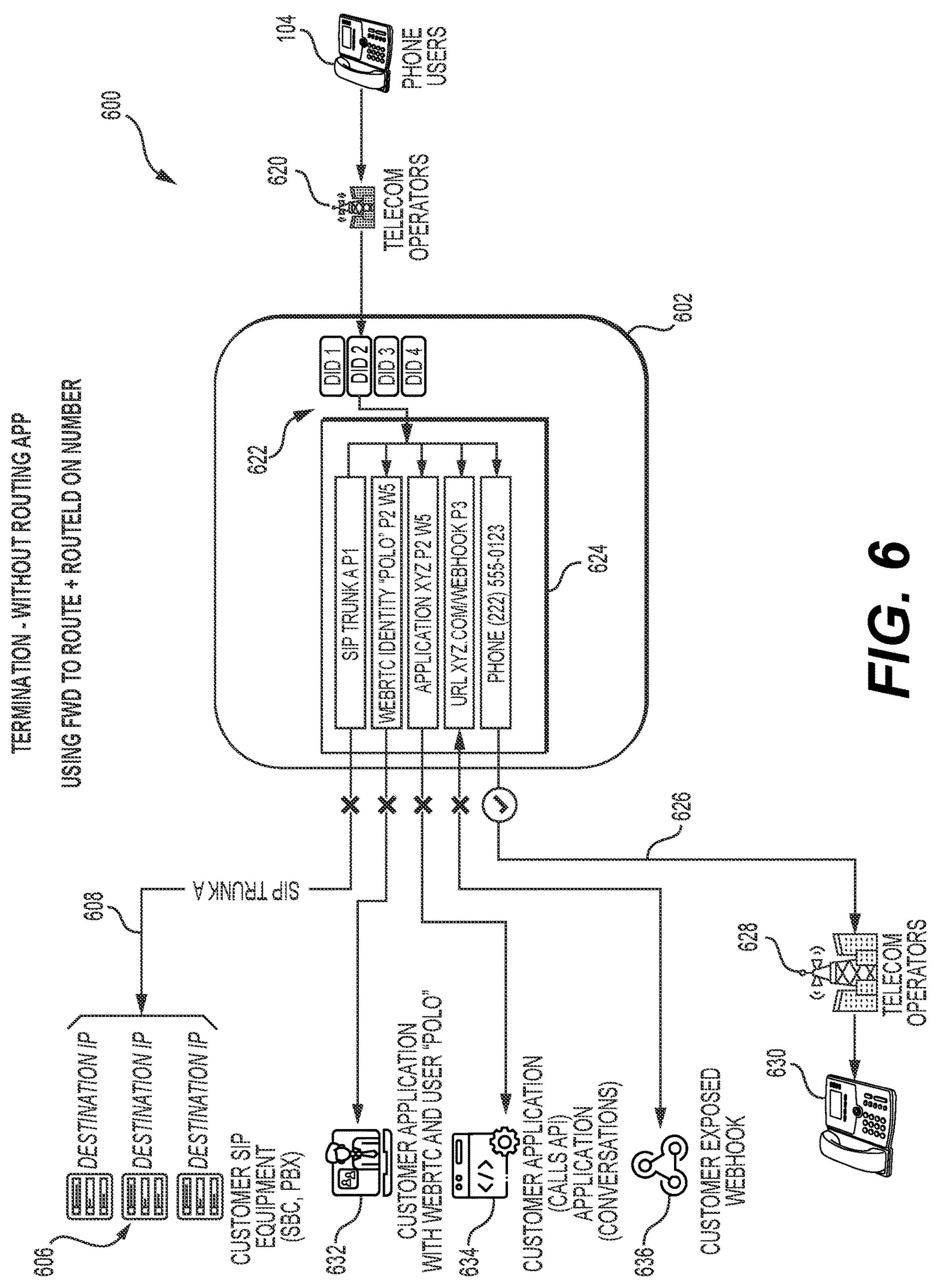
FIG. 6 is a flow diagram depicting a termination of a call with use of a routing application, in accordance with one or more embodiments.

FIG. 6 is a flow diagram 600 depicting a termination of a call with use of a routing application, in accordance with one or more embodiments. Similar to the example illustrated in FIG. 5, a phone call may originate with phone 104, be received by telecom operator 620, and forward the request to telecommunications platform 602 which owns the phone number associated with the intended destination. In the example shown in FIG. 6, DID 2 of phone numbers 622 owned by telecommunications platform 602 receives the incoming call from telecom operator 620. Telecommunications platform 602 includes logic for routing the incoming call to its intended destination.

The intended destination may be a person, and not specific hardware (e.g., a phone or computer). In other words, a user of phone 104 desires to reach an individual associated with the phone number or contact information input into phone 104. An individual may have accounts with several different applications through which others may reach them for a voice call. For example, an individual may have a desk IP phone, a PSTN-connected phone, and one or more other accounts that provide VoIP services. Accordingly, routing protocol 624 may be defined by an administrator of telecommunications platform 602 such that an individual may be reached via one or more different communication channels or destinations. For example, an individual may have access to one or more IP phones 606 that may be connected to telecommunications platform 602 via one or more SIP trunks 608. The individual may also have access to a customer application 632 with WebRTC provided by telecommunications platform 602, a customer application 634 managed by (or based on a communications API provided by) telecommunications platform 602, a URL pointing to a customer-exposed webhook 636, and a PSTN-connected phone line 630.

Routing protocol 624 may be defined to send a request to connect with a phone number associated with a particular individual first to one or more IP phones 606 via SIP trunk 608. If the attempt to connect to one or more IP phones 606 via one or more SIP trunks 608 fails, routing protocol 624 may direct the request to customer application 632. If the attempt to connect to customer application 632 fails, routing protocol 624 may direct the request to customer application 634. If the attempt to connect to customer application 634 fails, routing protocol 624 may direct the request to customer-exposed webhook 636. Customer-exposed webhook 636 may respond with an action the routing protocol 624 should take. The action specification follows the capabilities of routing protocol 624, such as routing to a SIP endpoint, to a phone endpoint, to a WebRTC endpoint, or to an application, for example. This gives the ability for the customer (administrator) to enable dynamic routing elements where, based on the call data that telecommunications platform 602 sends to the customer-exposed webhook 636, application logic may decide in real time how to route the call. Finally, if the attempt to connect to customer-exposed webhook 636 fails, routing protocol 624 may direct the request to PSTN-connected line 626. Telecom operator 628 may receive the request and forward the request to PSTN-connected phone line 630. In this manner, a call originating from phone 104 may arrive at the intended individual in a timely manner.

Figure 7:
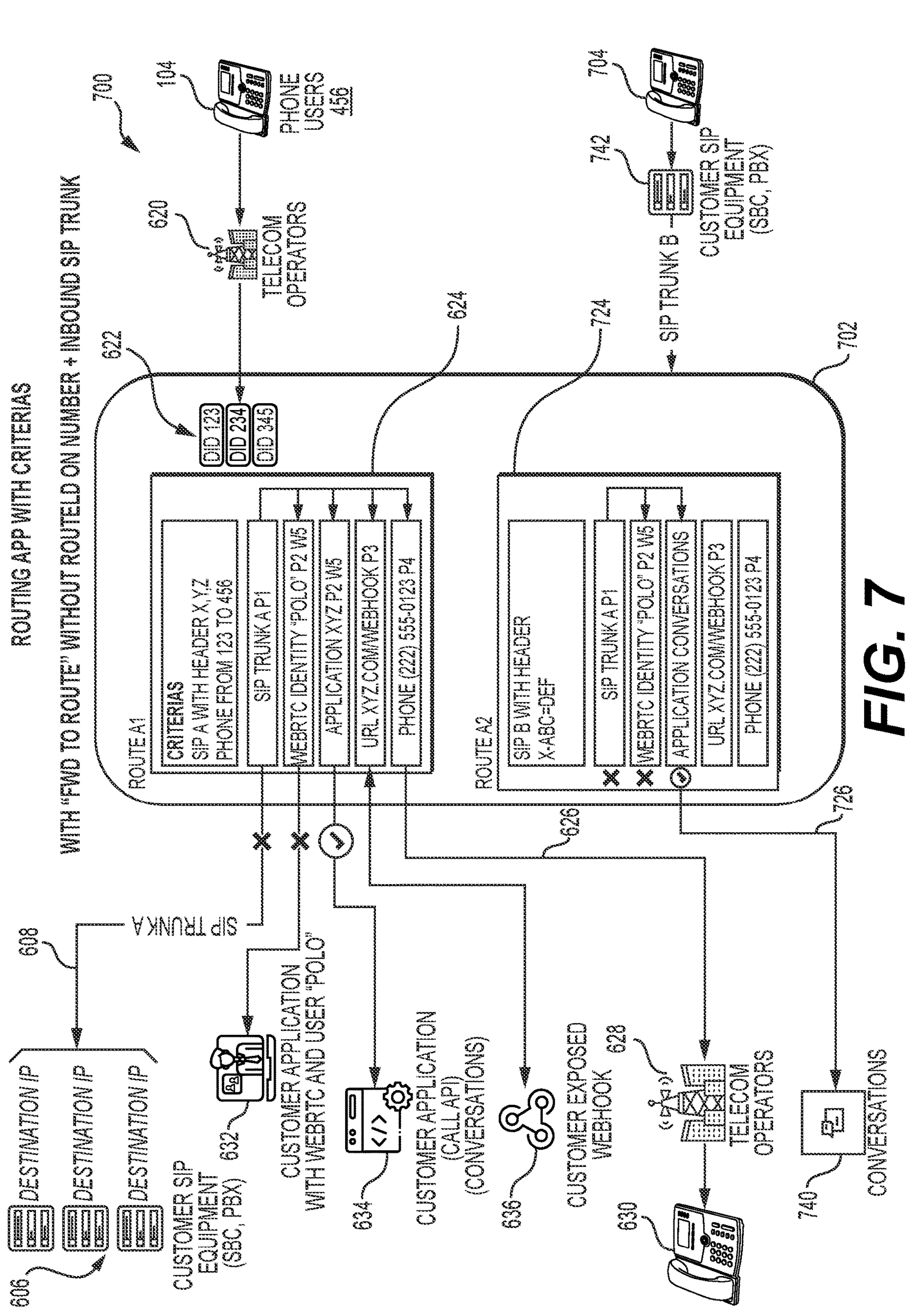
FIG. 7 is a flow diagram depicting a routing application with criteria for routing, in accordance with one or more embodiments.

FIG. 7 is a flow diagram 700 depicting a routing application with criteria for routing, in accordance with one or more embodiments. In some cases, flow diagram 700 discussed in FIG. 7 is similar to flow diagram 600 discussed with relation to FIG. 6.

As shown in FIG. 7, telecommunications platform 702 may receive an incoming call from phone 104 via telecom operator 620 to phone numbers 622, and may receive an incoming call from phone 704 via SIP equipment 742 over an SIP trunk. Telecommunications platform 702 may route calls from phone 104 and/or phone 704 to any of IP phones 606, customer application 632, customer application 634, customer-exposed webhook 636, PSTN-connected phone line 630 or a platform application such as conversations 740, for example. Telecommunications platform 702 may route calls to applications such as conversations 740 over communication line 726. Telecommunications platform 702 may route calls using routing protocol 624 and routing protocol 724, which may each have individualized routing parameters.

As shown in FIG. 7, routing protocol 624 and routing protocol 724 may include "CRITERIAS". In FIG. 6, when an inbound phone call reaches a DID number on telecommunications platform 602, that DID number may be configured to explicitly trigger a defined route. In FIG. 7, a DID number on telecommunications platform 702 may be configured to forward the call to the routing application, but without specifying any explicit route to use. In such a case, routing protocol 624 may search for routes that have any matching criteria corresponding with the inbound call, and if found, may trigger the first route matching with such criteria(s). Accordingly, routing protocol 624 and routing protocol 724 may be activated on inbound SIP traffic and WebRTC traffic, in addition to inbound phone traffic.

Figure 8:
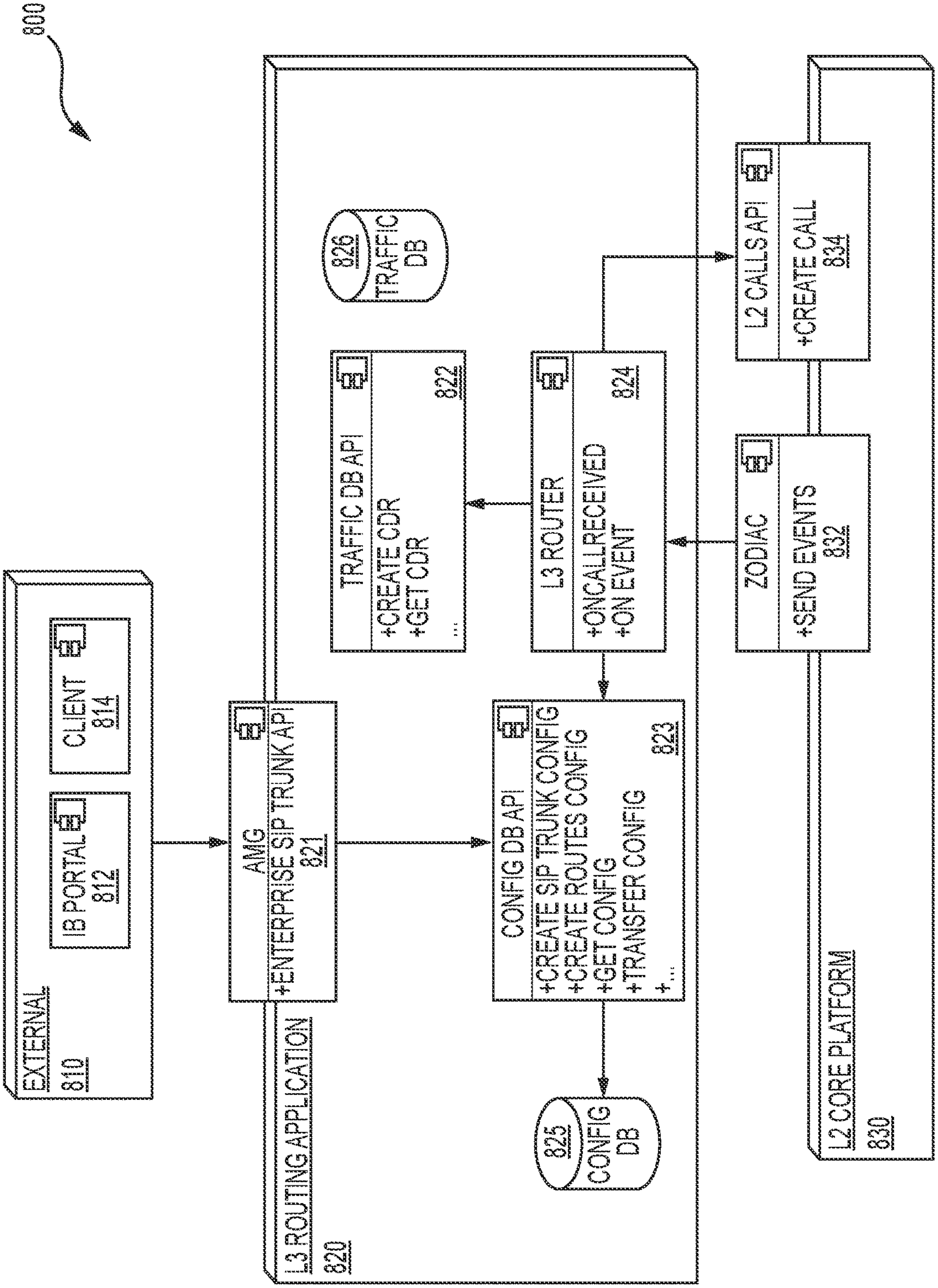
FIG. 8 is an exemplary system infrastructure for a routing application, in accordance with one or more embodiments.

FIG. 8 is an exemplary system infrastructure for a routing application, in accordance with one or more embodiments. Telecommunications platform 702 may include telecommunications infrastructure 800. Telecommunications infrastructure 800 may include external interface 810, routing application 820, and core platform 830. External interface 810 may include portal 812 and client 814. Routing application 820 may include AMG 821, traffic database API 822, configuration database API 823, router 824, configuration database 825, and traffic database 826. Core platform 830 may include zodiac 832 and calls API 834.

Figure 9:
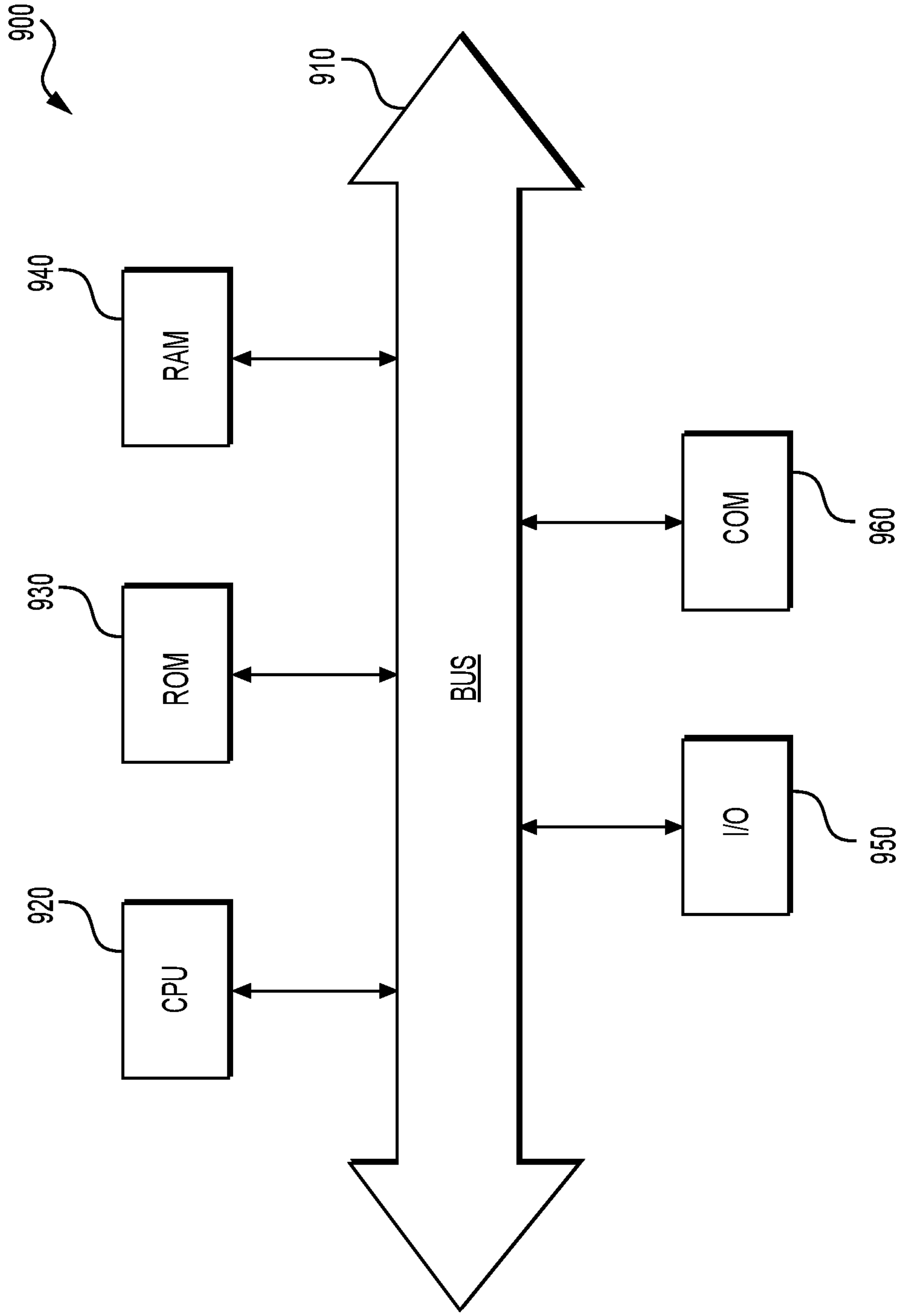
FIG. 9 illustrates an example device that may execute techniques presented herein.

FIG. 9 illustrates an example device 900 that may execute techniques presented herein. For example, device 900 of FIG. 9 may be used to perform processes related to any systems, components, blocks, operations, and/or steps discussed herein such as, for example, those discussed in reference to other figures. Device 900 may include a central processing unit (CPU) 920. CPU 920 may be any type of processor device including, for example, any type of special purpose or a general-purpose microprocessor device. As will be appreciated by persons skilled in the relevant art, CPU 920 also may be a single processor in a multi-core/multi-processor system, such system operating alone, or in a cluster of computing devices operating in a cluster or server farm. CPU 920 may be connected to a data communication infrastructure 910, for example a bus, message queue, network, or multi-core message-passing scheme.

Device 900 may also include a main memory 940, for example, random access memory (RAM), and also may include a secondary memory 930. Secondary memory 930, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 930 may include similar means for allowing computer programs or other instructions to be loaded into device 900. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 900.

Device 900 also may include a communications interface ("COM") 960. Communications interface 960 allows software and data to be transferred between device 900 and external devices. Communications interface 960 may include a modem, a network interface (such as an Ethernet card), a communications port, a PCMCIA slot and card, or the like. Software and data transferred via communications interface 960 may be in the form of signals, which may be electronic, electromagnetic, optical or other signals capable of being received by communications interface 960. These signals may be provided to communications interface 960 via a communications path of device 900, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 900 may also include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically can be grouped together to perform a function or group of related functions. Like reference numerals are generally intended to refer to the same or similar components. Components and modules may be implemented in software, hardware or a combination of software and hardware.

The tools, modules, and functions described above may be performed by one or more processors. "Storage" type media may include any or all of the tangible memory of the computers, processors, or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. In addition, the presently disclosed embodiments may be applicable to any type of Internet protocol.

Figure 10:
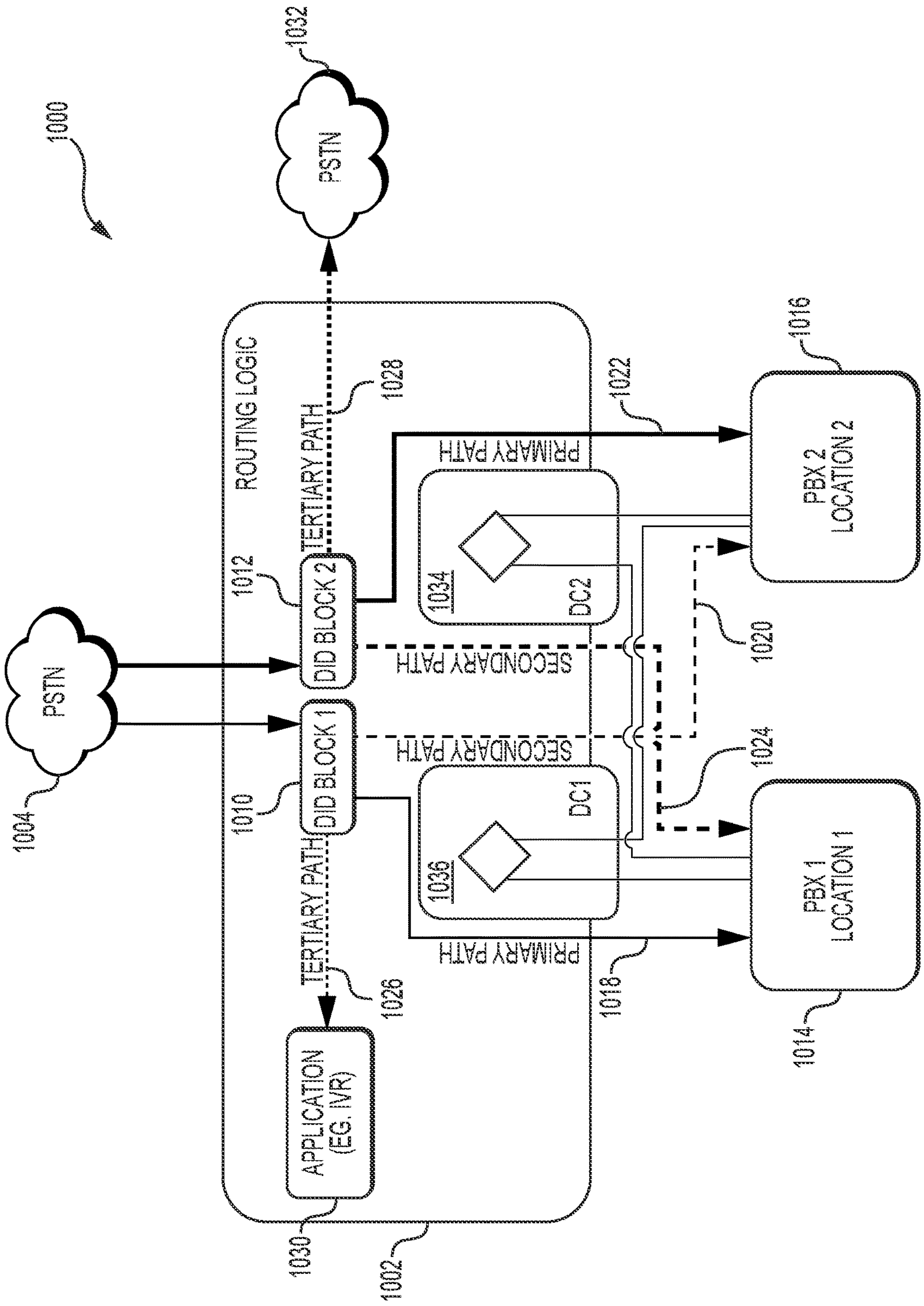
FIG. 10 is a flow diagram depicting an example routing scenario, in accordance with one or more embodiments.

FIG. 10 is a flow diagram 1000 depicting an example routing scenario, in accordance with one or more embodiments. A customer may have two destinations that are backups to each other. However, each destination may be preferred as a destination for each DID block due to the physical location of the destinations. For example, because first DID block 1010 is associated with first location 1014, a path 1018 may be prioritized over path 1020. Further, because second DID block 1012 is associated with second location 1016, a path 1022 may be prioritized over secondary path 1024. Tertiary path 1026 may route the call to an application 1030 (e.g., IVR). Tertiary path 1028 may route the call to a PSTN-connected phone line 1032. While FIG. 10 shows that the call originates from PSTN-connected phone line 1004, the call may originate from a SIP trunk, multiple SIP trunks, or an application such as WebRTC.

As shown, a customer may have two SIP trunks provisioned in two different data centers. When an inbound call (e.g. from PSTN-connected phone line 1004) comes in to a DID number associated with a route that includes both SIP trunks, the primary path may be used to try to send this call to the first SIP trunk in the destination list, where the SIP trunk is connected to the customer's PBX1 (first location 1014). If PBX1 is not reachable or does not answer within a defined timeout period, the second SIP trunk (connected to PBX2 at second location 1016) may be tried. If the second trunk doesn't answer (e.g., PBX2 is not reachable or does not answer within a defined timeout period), than a connection to a tertiary destination (e.g., PSTN-connected phone line 1032) may be tried.

Telecommunications platform 1002 may include DC 1034 and DC 1036, which may each include communication paths to first location 1014 and second location 1016. Basic routing elements may include a session agent group (SAG). Routing may only send one call to an SAG, and a Session Border Controller (SBC) may complete the rest of the calls.

Figure 11:
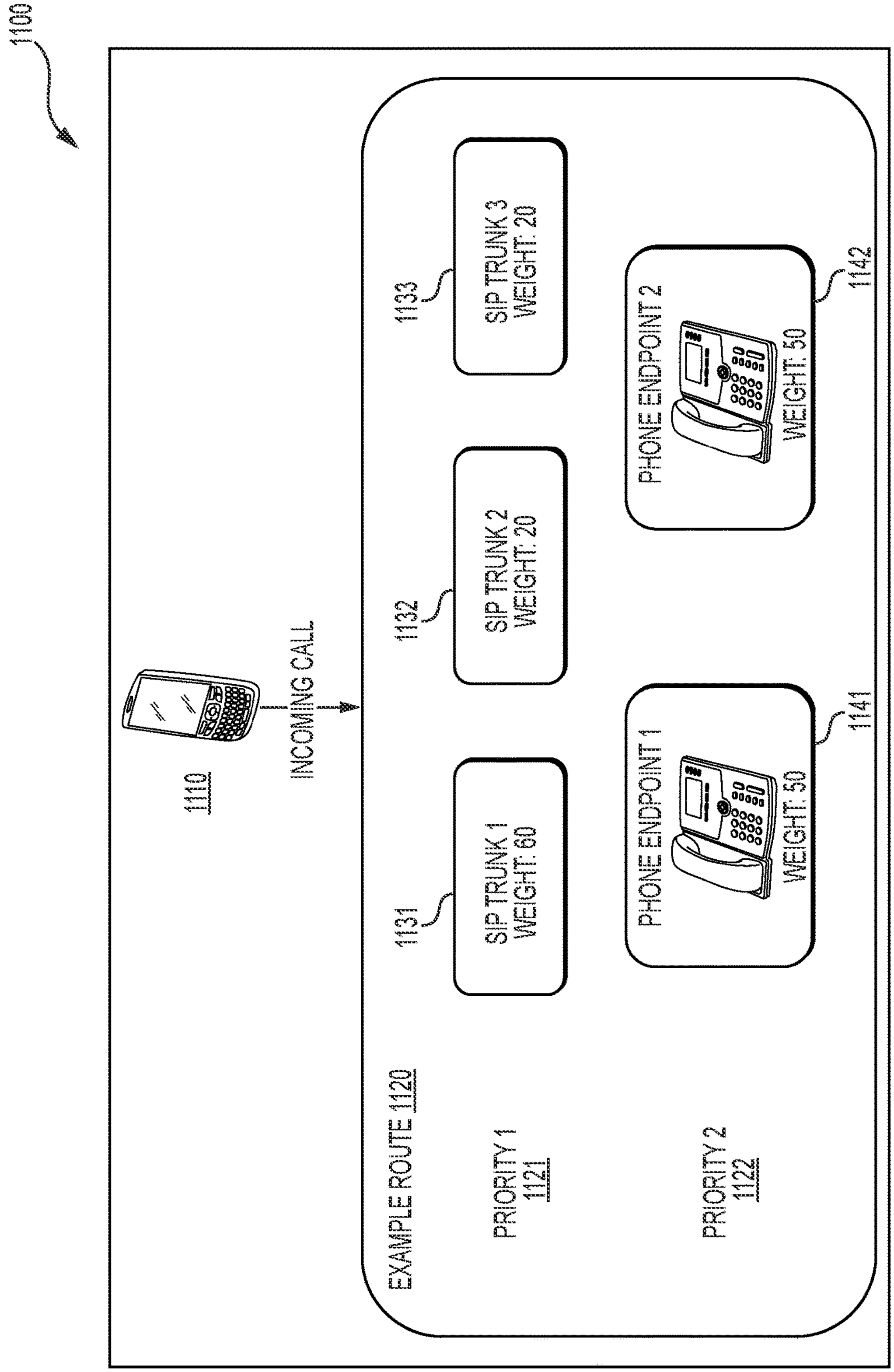
FIG. 11 is a flow diagram depicting an example routing scenario with priorities, in accordance with one or more embodiments.

FIG. 11 is a flow diagram depicting an example routing scenario 1100 with priorities, in accordance with one or more embodiments. A telecommunications platform, such as telecommunications platform 1002, for example, may receive incoming call 1110. A routing protocol of telecommunications platform 1002, such as routing protocol 724, for example, may have individualized routing parameters to route incoming call 1110 as route 1120, such as priority 1121 and priority 1122. Priority 1121 may include SIP trunk 1 weight 1131, SIP trunk 2 weight 1132, and SIP trunk 3 weight 1133. SIP trunk 1 weight 1131 may be a weighting factor of 60%, SIP trunk 2 weight 1132 may be a weighting factor of 20%, and SIP trunk 3 weight 1133 may be a weighting factor of 20%. Priority 1122 may include phone 1 weight 1141 and phone 2 weight 1142. Phone 1 weight 1141 may be a weighting factor of 50%, and phone 2 weight 1142 may be a weighting factor of 50%.

Each element in a route may be assigned a priority and a weight. Elements with the highest priority (e.g. where priority "1" is highest, and priority "100" is lowest) may be evaluated first. Elements in a route may have a same priority, in which case, the weight factor may be used. The weight may be used in consideration of all calls to the route. Each route may include an internal counter, and for each new call, the counters may be used to determine where the call should be forwarded. For example, as shown in FIG. 11, for a first ten calls, six calls may be forwarded to SIP trunk 1, two calls to SIP trunk 2, and two calls to SIP trunk 3. For the first call, an attempt may be made, in order and upon failed attempts, to SIP trunk 1 with priority 1 and weight 60, then to SIP trunk 2 with priority 1 and weight 20, then to SIP trunk 3 with priority 1 and weight 20. If attempts to all priority 1 destinations fail, then attempts to priority 2 destinations may be made based on decreasing weights and based on counters.

It will be apparent to those skilled in the art that various modifications and variations can be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

What is claimed is:

1. A method for routing traffic for voice communication, the method comprising:

receiving a request to establish a telecommunication link with a first endpoint associated with a destination phone number;

searching, using a predetermined routing protocol, for a first communication channel assigned criteria that match the request to establish the telecommunication link with the first endpoint associated with the destination phone number, the first communication channel including a session initiated protocol (SIP) trunk;

transmitting the received request to establish the telecommunication link to the first endpoint associated with the destination phone number via the first communication channel including the SIP trunk;

determining that the request to establish the telecommunication link via the first communication channel including the SIP trunk failed; and transmitting, via a second communication channel, the received request to establish the telecommunication link to a second endpoint that is a fallback for the first endpoint, based on the predetermined routing protocol.

2. The method of claim 1, wherein the determining that the request to establish the telecommunication link failed includes receiving an indication from the first endpoint that the request has been denied.

3. The method of claim 1, wherein the determining that the request to establish the telecommunication link failed includes a timeout for response from the first endpoint.

4. The method of claim 1, wherein the destination phone number is associated with one or more of an internet protocol (IP) phone or a voice over IP (VOIP) phone.

5. The method of claim 1, wherein the second communication channel includes a public switched telephone network (PSTN) line.

6. The method of claim 1, wherein the second communication channel includes an internet network connection, or wherein the second endpoint is a web real-time communication application.

7. The method of claim 1, wherein the second endpoint includes a customer application, a SIP endpoint, an application associated with a Voice over Internet Protocol (VoIP) service, or a voice application.

8. The method of claim 1, wherein the predetermined routing protocol represents a plurality of communication channels, and wherein each of the plurality of communication channels is assigned respective criteria.

9. The method of claim 1, further comprising:

creating the predetermined routing protocol, wherein the second endpoint is a uniform resource locator (URL) pointing to a customer exposed webhook, wherein the customer exposed webhook is configured to transmit a response representing an action to the predetermined routing protocol, thereby permitting dynamic routing following creation of the predetermined routing protocol.

10. The method of claim 1, wherein the predetermined routing protocol represents a plurality of communication channels including at least uniform resource locators (URLs) and the SIP trunk, wherein each of the plurality of communication channels is assigned respective criteria, the method further comprising:

searching, using the predetermined routing protocol, for the second communication channel of the plurality of communication channels, wherein the second communication channel includes one of the URLs and is assigned criteria that match the request to establish the telecommunication link with the first endpoint associated with the destination phone number.

11. The method of claim 1, wherein the predetermined routing protocol represents a plurality of communication channels including at least a plurality of uniform resource locators (URLs) and the SIP trunk, wherein each of the plurality of communication channels is assigned respective criteria, the method further comprising:

searching, using the predetermined routing protocol, for the second communication channel of the plurality of communication channels, wherein the second communication channel includes a first URL of the plurality of URLs and is assigned criteria that match the request to establish the telecommunication link with the first endpoint associated with the destination phone number;

determining that the received request to establish the telecommunication link to the second endpoint via the second communication channel failed;

searching, using the predetermined routing protocol, for a third communication channel of the plurality of communication channels, wherein the third communication channel includes a second URL of the plurality of URLs and is assigned criteria that match the request to establish the telecommunication link with the first endpoint associated with the destination phone number; and transmitting, via the third communication channel, the received request to establish the telecommunication link to a third endpoint that is a fallback for the second endpoint, based on the predetermined routing protocol.

12. A non-transitory computer-readable medium storing instructions thereon that, when executed by one or more processors, cause the one or more processors to perform operations comprising:

receiving a request to establish a telecommunication link with a first endpoint associated with a destination phone number;

searching, using a predetermined routing protocol, for a first communication channel assigned criteria that match the request to establish the telecommunication link with the first endpoint associated with the destination phone number, the first communication channel including a session initiated protocol (SIP) trunk;

transmitting the received request to establish the telecommunication link to the first endpoint associated with the destination phone number via the first communication channel including the SIP trunk;

determining that the request to establish the telecommunication link via the first communication channel including the SIP trunk failed; and transmitting, via a second communication channel, the received request to establish the telecommunication link to second endpoint that is a fallback for the first endpoint, based on the predetermined routing protocol.

13. The non-transitory computer-readable medium of claim 12, wherein the second communication channel includes an internet network connection.

14. The non-transitory computer-readable medium of claim 12, further comprising instructions thereon that, when executed by the one or more processors, cause the one or more processors to further perform operations including:

creating the predetermined routing protocol, wherein the second endpoint is a uniform resource locator (URL) pointing to a customer exposed webhook, wherein the customer exposed webhook is configured to transmit a response representing an action to the predetermined routing protocol, thereby permitting dynamic routing following creation of the predetermined routing protocol.

15. The non-transitory computer-readable medium of claim 12, further comprising instructions thereon that, when executed by the one or more processors, cause the one or more processors to further perform operations including:

determining that the received request to establish the telecommunication link to the second endpoint via the second communication channel failed; and transmitting, via a third communication channel, the received request to establish the telecommunication link to a third endpoint that is a fallback for the second endpoint, based on the predetermined routing protocol.

16. The non-transitory computer-readable medium of claim 12, wherein the second endpoint includes a customer application, a SIP endpoint, an application associated with a Voice over Internet Protocol (VoIP) service, or a voice application.

17. The non-transitory computer-readable medium of claim 12, wherein the second endpoint is a web real-time communication application.

18. A system comprising:

a data storage device storing processor-readable instructions; and one or more processors operatively connected to the data storage device and configured to execute the instructions to perform operations including:

receiving a request to establish a telecommunication link with a first endpoint associated with a destination phone number;

searching, using a predetermined routing protocol, for a first communication channel assigned criteria that match the request to establish the telecommunication link with the first endpoint associated with the destination phone number, the first communication channel including a session initiated protocol (SIP) trunk;

transmitting the received request to establish the telecommunication link to the first endpoint associated with the destination phone number via the first communication channel including the SIP trunk;

determining that the request to establish the telecommunication link via the first communication channel including the SIP trunk failed; and transmitting, via a second communication channel, the received request to establish the telecommunication link to a second endpoint that is a fallback for the first endpoint, based on the predetermined routing protocol.

19. The system of claim 18, wherein the second communication channel includes an internet network connection.

20. The system of claim 18, wherein the operations further include:

creating the predetermined routing protocol, wherein the second endpoint is a uniform resource locator (URL) pointing to a customer exposed webhook, wherein the customer exposed webhook is configured to transmit a response representing an action to the predetermined routing protocol, thereby permitting dynamic routing following creation of the predetermined routing protocol.

* * * * *